United States Patent [19]

LeBrasse et al.

[11] 4,002,472
[45] Jan. 11, 1977

[54] PROCESS FOR MAKING COMPOSITE BEARING MATERIAL

[75] Inventors: Gordon J. LeBrasse; Victor Gallatin, both of Ann Arbor, Mich.

[73] Assignee: Federal-Mogul Corporation, Southfield, Mich.

[22] Filed: May 1, 1975

[21] Appl. No.: 573,977

[52] U.S. Cl. .......................... 75/208 R; 29/182.3; 75/200; 75/208 CS; 75/224; 75/226; 75/227
[51] Int. Cl.² ..................................... B22F 3/18
[58] Field of Search .......... 75/208 R, 208 CS, 200, 75/224, 227, 226; 29/182.3

[56] References Cited

UNITED STATES PATENTS

| | | | |
|---|---|---|---|
| 2,815,567 | 12/1957 | Gould et al. | 75/208 CS |
| 2,986,464 | 5/1961 | Lewis et al. | 29/182.1 X |
| 3,094,415 | 6/1963 | Gallatin et al. | 75/208 CS |

OTHER PUBLICATIONS

Hansen, Constitution of Binary Phase Diagrams, McGraw-Hill, N.Y., 1958, pp. 609–612.
Goetzel, Treatise on Powder Metallurgy, vol. II Interscience, N.Y., 1950 pp. 475–479.

Primary Examiner—Richard E. Schafer
Attorney, Agent, or Firm—Harness, Dickey & Pierce

[57] ABSTRACT

A process for making a bimetallic bearing material comprising a hard metal backing strip having a leaded copper or leaded bronze bearing lining tenaciously bonded to at least one face thereof which includes the steps of applying a layer of a prealloyed metal powder of a controlled composition and particle size on one face of the backing strip, sintering the composite material in a reducing atmosphere at a temperature ranging from 1450° F to 1600° F, cooling the sintered composite strip to a temperature of 1000° F to 1200° F and densifying the composite strip by roll compaction to 100% of theoretical density in a manner to effect further sintering and enhancement of the bond strength between the backing material and lining. The compacted strip thereafter is allowed to cool to a temperature below about 800° F in a nonoxidizing protective environment whereafter it can be fabricated into various bearing components, such as thrust washers, bushings, shell bearings and the like.

10 Claims, 3 Drawing Figures

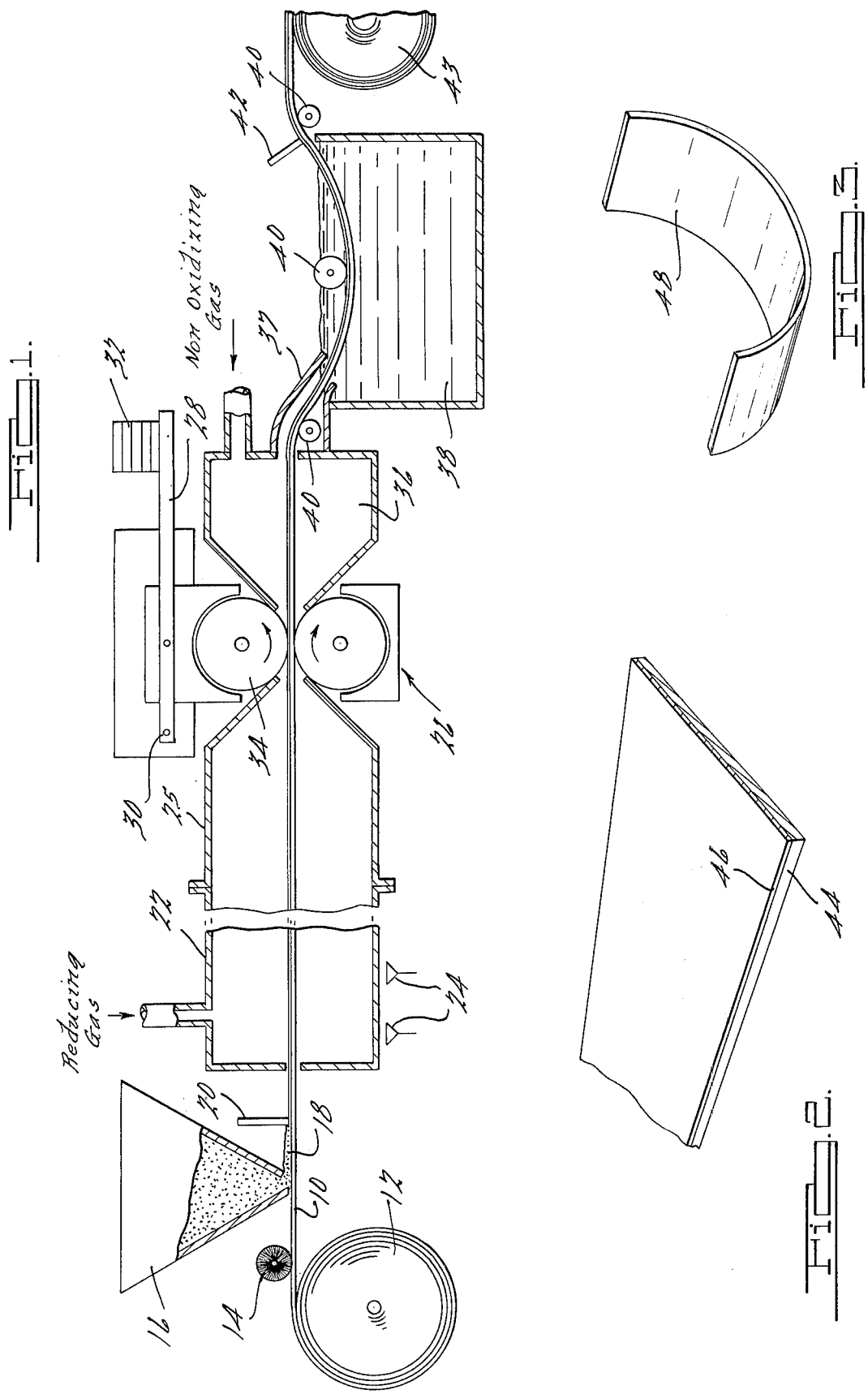

PROCESS FOR MAKING COMPOSITE BEARING MATERIAL

BACKGROUND OF THE INVENTION

Composite bearing materials comprising a hard metal backing strip, such as steel, having a bearing lining composed of copper-lead or leaded bronze are in widespread use for the fabrication of various bearing components for internal combustion engines, vehicle suspension, transmission assemblies and the like. A prior art process extensively employed for the commercial manufacture of composite copper-lead and leaded bronze bearing materials of the foregoing type is described in U.S. Pat. No. 2,986,464, granted to Lewis et al for "Method for Manufacturing Bearing Materials". In accordance with the process described in the aforementioned United States patent, a layer of metal powder having the desired copper, lead and tin content is applied to one surface of a steel backing strip, whereafter the powder layer is sintered at an elevated temperature and thereafter the strip is cooled and is passed through a roll compaction assembly to effect a reduction in the porosity of the sintered powder layer. Following the roll compaction step, the strip is again heated to an elevated temperature to effect a second sintering operation, whereafter the dual-sintered and compacted strip is quenched in a lead bath maintained at a temperature between about 700° F and 900° F in order to effect a filling of any residual porosity remaining after the cold compaction operation.

The process as described in the aforementioned United States patent, while eminently satisfactory for producing a high quality composite strip material, requires a substantial investment in equipment and a relatively large area of plant space to accommodate the double sintering operation separated by an intervening cooling and cold compaction operation. The foregoing processing sequence was considered necessary in order to produce bimetallic bearing materials having adequate bond strength between the lining and backing strip, and to avoid excessive exudation of lead or so-called lead "sweating" during the compaction operation.

It has now been discovered that bimetallic bearing materials having a copper-lead or leaded bronze lining bonded to a steel backing strip can be satisfactorily produced in one sintering and hot compaction operation by carefully controlled powder compositions, particle sizes and sintering and compaction temperatures wherein a substantial simplification and savings in plant space and capital equipment is effected.

SUMMARY OF THE INVENTION

The benefits and advantages of the present invention are achieved by a single sintering and hot compaction operation of prealloyed copper-lead or copper-lead-tin powders containing from about 64% up to 88% copper, from about 8% up to 35% lead, and up to about 10% tin, which are of a particle size less than about 100 mesh, and preferably incorporate particles 50% of which are less than about 325 mesh. The prealloyed metal powder is applied in the form of a substantially uniform layer on a chemically-clean surface of a hard metal backing strip, such as a low-alloy steel strip, and thereafter is sintered in a reducing atmosphere at a temperature carefully controlled between about 1450° F to about 1600° F. The sintering is carried out so as to produce a liquid phase which effects a bonding of the particles to each other, as well as to the surface of the hard metal backing strip, whereafter the strip is cooled to a controlled temperature of from about 1000° F to about 1200° F and is roll compacted to substantially 100% of theoretical density. Upon exiting the roll assembly, the densified strip is cooled in a nonoxidizing protective environment to a temperature below about 800° F, which may conveniently be achieved by passing the strip through a molten lead bath at about 800° F. The resultant strip after further cooling can be employed directly for the fabrication of various bearing components or can be coiled and stored for future use.

Additional benefits and advantages of the present process will become apparent upon a reading of the description of the preferred embodiments taken in conjunction with the accompanying drawing.

BRIEF DESCRIPTION OF THE DRAWING

FIG. 1 is a schematic side elevational view, partly in section, illustrating the process for fabricating a bimetallic strip in accordance with the present invention.

FIG. 2 is a fragmentary perspective view of the resultant bimetallic strip produced; and FIG. 3 is a perspective view of a typical split shell-type bearing fabricated from the bimetallic strip of FIG. 2.

DESCRIPTION OF THE PREFERRED EMBODIMENTS

The composite bearing material in accordance with the preferred practice of the present invention is comprised of a hard metal backing strip, preferably comprising a low-alloy steel such as SAE Type 1010 or 1020, having a thickness of from about 0.040 up to about 0.250 inch. The surface of the steel backing strip to which the metal powder is to be applied is first chemically and/or mechanically cleaned to remove any residual dirt, scale or oxide therefrom to assure the attainment of a high strength bond between the backing strip and the subsequent bearing lining. This can be achieved by a solvent degreasing step, followed by sanding or wire brushing to provide a chemically-clean surface.

The metal powder for forming the bearing lining comprises a copper-lead or a copper-lead-tin prealloyed powder which may contain from about 64% to about 88% copper, from about 8% to about 35% lead and from zero up to about 10% tin. It is important that the powder is in a prealloyed form, preferably wherein each particle is of the same composition, although prealloyed powders of alternative compositions can be admixed to provide a resultant composition corresponding to that desired for the bearing lining. Typical of such copper-lead and leaded bronze alloys are SAE Grade 797, nominally composed of 80% copper, 10% lead, 10% tin; SAE Grade 798, nominally containing 88% copper, 8% lead and 4% tin; SAE Grade 799, nominally containing 73.5% copper, 23% lead and 3.5% tin; SAE Grade 49, nominally containing 75.5% copper, 24% lead and 0.5% tin; SAE Grade 480, nominally composed of 64.5% copper, 35% lead and ½% tin, expressed in terms of percent by weight. The shape of the prealloyed powder particles is not critical, although spherical particles are preferred. The particle size of the prealloyed powder should be less than about 100 mesh (147 microns) to particle sizes as small as one micron. Preferably, the metal powder contains particles distributed over the entire permissible particle size range with 50% thereof being less than 325 mesh (44 microns), thereby achieving optimum loose powder packing density. The loose powder density as applied to the upper surface of the backing strip may typically be about 50% to about 60% of 100% theoretical density and is usually applied in amounts of about 0.020 to about 0.070 inch, such that the resultant sintered and densified lining ranges in thickness from about 0.010 to about 0.035 inch.

Referring now in detail to the drawing and as best seen in FIG. 1, a bimetallic bearing material is made in accordance with the practice of the present invention by uncoiling a steel backing strip 10 from a supply coil 12 and extending it in a horizontal direction so as to come in contact with a wire brush 14 for effecting a mechanical cleaning of the upper face of the strip. The strip thereafter travels horizontally beneath the outlet end of a hopper 16 filled with a prealloyed powder of the requisite composition and particle size, which is deposited in the form of a powder layer 18, which is doctored by a knife 20 to a substantially uniform layer of the desired thickness.

The strip having the powder layer thereon thereafter enters a furnace 22 having a plurality of heaters 24 therebelow and is heated in the presence of a reducing atmosphere to a sintering temperature ranging from 1450° F up to 1600° F. The reducing atmosphere may conventionally comprise one derived from the incomplete combustion of natural gas containing, for example, 12% hydrogen, 10% carbon monoxide and 5% carbon dioxide, with the balance essentially nitrogen. The presence of the reducing atmosphere serves to reduce the oxides present on the surfaces of the metal powder particles and to prevent further oxidation thereof at the elevated sintering temperatures to which they are subjected.

The specific temperature employed will vary depending upon the particular composition of the prealloyed powder. For example, temperatures of about 1450° F are satisfactory for leaded bronze powders nominally containing about 80% copper, 10% lead and 10% tin; whereas temperatures in the region of 1600° F are required for alloys nominally containing 75% copper, 24% lead and only 1% tin. In any event, the specific sintering temperature is controlled so as to produce a liquid phase consisting predominantly of lead, which effects a wetting of the particles and a filling of the interstices present in the powder layer, as well as wetting the surface of the steel strip to promote the formation of a tenacious bond. Sintering temperatures below about 1450° F are unsatisfactory since no appreciable bonding is achieved, whereas temperatures in excess of about 1600° F are unsatisfactory due to the excessive degree of liquid phase formed during the sintering operation. Normally, sintering for a period of from about three up to about five minutes at temperatures of 1450° F to 1600° F are satisfactory for achieving a satisfactory liquid phase sintering of the powder particles and the formation of a lead-copper alloy bond at the surface of the steel strip.

At the conclusion of the sintering operation, the composite strip enters a cooling section 25 in which the strip is partially cooled to an intermediate temperature of 1000° F to 1200° F in a nonoxidizing protective atmosphere and thereafter enters the inlet of a roll assembly 26 in which the powder layer is compacted to a density substantially approaching 100% theoretical density, and wherein the powder particles are deformed and pressed into contact with the surface of the steel strip under conditions wherein a further sintering and bonding thereof occurs. As shown in FIG. 1, the outlet end of the cooling section 25 is of a converging configuration so that the nonoxidizing atmosphere such as a reducing atmosphere therein enters the bight section of the roll assembly protecting the heated strip during the compaction operation. Moreover, the cooling section 25 is controlled such that the strip is cooled from the normal sintering temperature range of 1450° F to 1600° F to an intermediate temperature of about 1000° F to about 1200° F, which is important to achieve the necessary compaction of the powder particles and a simultaneous sintering and diffusion bonding thereof during the compaction operation. Roll compaction of the strip at temperatures less than about 1000° F is undesirable due to the difficulty of achieving substantially 100% densification of the porous powder layer in addition to inadequate sintering and diffusion bonding of the deformed powder particles. On the other hand, temperatures in excess of about 1200° F are undesirable due to the formation of an excessive amount of liquid phase at the bond line and excessive exudation of lead from the compacted powder layer. The specific pressure employed during the roll compaction operation will vary depending upon the specific diameter of the roll, the temperature at which the roll compaction is performed and the specific composition of the prealloyed powder layer. Generally, pressures of about 5,000 psi have been found satisfactory for most of the copper-lead and leaded bronze powders in further consideration that as the quantity of lead increases, the lining progressively becomes softer and that leaded bronze is a harder material to roll than ordinary copper-lead.

As shown in FIG. 1, appropriate control of the compaction pressure to apply a constant pressure during the roll compaction of the powder layer is conveniently achieved by a weighted roll assembly including a lever 28 pivotally connected at 30 to the roll assembly framework and having a platform on which weights 32 are adapted to be stacked to apply the desired downward pressure on the upper roll 34. In accordance with this arrangement, a uniform pressure is applied to the powder layer in spite of slight irregularities in the thickness thereof, thereby avoiding localized high pressure areas as in the case of a fixed gap roll assembly.

The densified composite strip, upon exiting the roll assembly, immediately enters a chamber 36, which also is filled with a nonoxidizing protective atmosphere whereby a progressive cooling of the strip is achieved from the roll compaction temperature down to about 900° F to about 1000° F. The travel of the composite strip through the chamber 36 also provides time for reabsorption of any molten lead phase on the surfaces of the lining into the pores of the sintered powder layer. At the exit end of the chamber 36, the strip passes through a chute 37 and may enter a suitable cooling device for reducing its temperature below about 800° F. This can be achieved as shown in FIG. 1 by passing the strip through a molten lead bath 38 maintained at a temperature of about 750° F to about 850° F. The strip is guided by rolls 40 during its passage into and out of the lead bath and upon emergence thereof, passes under a wiper 42 for removing excess lead from the surface thereof. Upon subsequent further cooling to room temperature, the strip can be directly subjected to metal stamping, blanking and forming operations to fabricate various bearing components including shell-type half bearings, bushings, thrust washers, etc. Alternatively, the strip can be coiled into a coil 43 in which form it can be stored until used. It is also contemplated that if a composite strip is desired having a bearing lining on both faces thereof, the coil 43 can be reprocessed to apply a second lining on the bare surface thereof in the same manner as previously described. A typical section of the bimetallic strip is illustrated in FIG. 2 comprising the steel backing strip 44 having a densified copper-lead or leaded bronze lining 46 tenaciously bonded to one surface thereof. The term "strip" as herein employed is also intended to encompass plate stock of a thickness greater than about 0.250 inch. A typical shell-type half bearing 48 fabricated from the composite strip shown in FIG. 2 is illustrated in FIG. 3.

While it will be apparent that the invention herein described is well calculated to achieve the benefits and advantages as hereinabove set forth, it will be appreciated that the invention is susceptible to modification, variation and change without departing from the spirit thereof.

What is claimed is:

1. A process for making a composite bearing material comprising a steel backing strip having a copper-lead bearing alloy lining tenaciously bonded to at least one side thereof which comprises the steps of applying a layer of a prealloyed powder on the surface of a steel backing strip, said prealloyed powder containing about 64% to about 88% copper, about 8% to about 35% lead and up to about 10% tin and ranging in average particle size of from about one micron up to about 147 microns, heating the prealloyed powder layer and said backing strip to a temperature of about 1450° F to about 1600° F in a reducing atmosphere for a period of time sufficient to effect a liquid phase sintering of the powder and the formation of a bond between said layer and said backing strip, cooling the sintered layer and backing strip to about 1000° F to about 1200° F in a protective atmosphere and applying pressure thereto to effect a substantially complete densification of said powder layer and a further diffusion bonding of the powder particles to each other and to the surface of said backing strip, and thereafter cooling the composite strip in a protective environment to a temperature below about 800° F.

2. The process as defined in claim 1, in which the powder layer is applied on said backing strip in a thickness of about 0.020 to about 0.070 inch.

3. The process as defined in claim 1, in which said prealloyed powder contains particles of a substantially spherical configuration which are of a size randomly distributed over the permissible size range.

4. The process as defined in claim 1, in which the application of pressure to the sintered powder layer is achieved by a roll compaction in a manner to achieve a powder layer density of substantially 100% density.

5. The process as defined in claim 4, in which the roll compaction is performed to apply a pressure of about 5000 psi on the powder layer.

6. The process as defined in claim 1, wherein cooling of the composite material is achieved by passing it through a molten lead bath.

7. The process as defined in claim 1, including the further step of precleaning said surface of said steel backing strip to provide a metallurgically clean surface prior to the step of applying a layer of a prealloyed powder thereon.

8. The process as defined in claim 1, in which said prealloyed powder is comprised of particles of an average size randomly distributed over the range of from 1 micron to about 147 microns with about 50% thereof less than 44 microns.

9. The process as defined in claim 1, in which the step of cooling the composite strip in a protective environment to a temperature below about 800° F is performed by first cooling the composite strip in a protective atmosphere to a temperature of from about 900° F to about 1000° F and thereafter introducing the composite strip into a molten lead bath.

10. A process for making a composite bearing material comprising a steel backing strip having a copper-lead bearing alloy lining tenaciously bonded to at least one side thereof which comprises the steps of applying a layer of a prealloyed powder on the surface of a steel backing strip in a thickness of about 0.020 to about 0.070 inch, said prealloyed powder containing about 64% to about 88% copper, about 8% to about 35% lead and up to about 10% tin and ranging in average particle size of from about 1 micron up to about 147 microns with 50% of the particles being less than 44 microns, heating the prealloyed powder layer and said backing strip to a temperature of about 1450° F to about 1600° F in a reducing atmosphere for a period of time sufficient to effect a liquid phase sintering of the powder and the formation of a bond between said layer and said backing strip, cooling the sintered layer and backing strip to about 1000° F to about 1200° F in a protective atmosphere and applying pressure thereto by a roll compaction to effect densification of said powder layer to substantially 100% theoretical density and a further diffusion bonding of the powder particles to each other and to the surface of said backing strip forming a composite strip, cooling the composite strip in a protective atmosphere to a temperature of from about 900° F to about 1000° F and thereafter passing the composite strip through a molten lead bath to effect a cooling thereof to a temperature below about 800° F.

* * * * *